July 7, 1964 L. A. TURZILLO Re. 25,614

MEANS OF GROUTING AND CONCRETING

Original Filed Oct. 8, 1958

4 Sheets-Sheet 1

INVENTOR.
Lee A. Turzillo
BY
William Cleland
ATTORNEY

July 7, 1964

L. A. TURZILLO

Re. 25,614

MEANS OF GROUTING AND CONCRETING

Original Filed Oct. 8, 1958

4 Sheets-Sheet 2

INVENTOR.
Lee A. Turzillo

BY
William Cleland

ATTORNEY

MEANS OF GROUTING AND CONCRETING

Original Filed Oct. 8, 1958 4 Sheets-Sheet 3

INVENTOR.
Lee A. Turzillo
BY William Cleland
ATTORNEY

MEANS OF GROUTING AND CONCRETING

Original Filed Oct. 8, 1958 4 Sheets-Sheet 4

INVENTOR.
Lee A. Turzillo
BY
William Cleveland
ATTORNEY

United States Patent Office

Re. 25,614
Reissued July 7, 1964

25,614

MEANS OF GROUTING AND CONCRETING

Lee A. Turzillo, Bath, Ohio
(2078 Glengary Road, Akron, Ohio)

Original No. 3,099,911, dated Aug. 6, 1963, Ser. No. 766,001, Oct. 8, 1958. Application for reissue Sept. 18, 1963, Ser. No. 309,910
6 Claims. (Cl. 61—35)

Matter enclosed in heavy brackets [ ] appears in the original patent but forms no part of this reissue specification; matter printed in italics indicates the additions made by reissue.

This invention relates to grouting means for stabilizers, soils and foundation materials, plugging leaks and voids, placing piles, and for similar original and remedial operations.

A feature contemplated by the invention is the compaction of soil at a desired situs directly by action of sufficiently high hydrostatic pressure exerted by means of injected grout but in such a way as to prevent migration of the grout from the situs through the voids, faults and the like.

Another feature contemplated by the invention is the compaction of soil at a desired situs directly by action of sufficiently high hydrostatic pressure exerted by means of injected grout without the preceding use of hydraulic presses or without the necessity for previously injecting a thixotropic liquid or the like which must be subsequently displaced by the grout.

Another feature contemplated by the invention is the accomplishment of grouting or concreting at a desired situs within soil while at the same time increasing the bearing value and density of surrounding soil even if such soil contains fissures or voids.

Another feature contemplated by the invention is the enhancement of load bearing values by increasing point bearing values and/or skin friction to higher values than those which would be attained where conventional grouting operations are employed. One application of this aspect of the invention is in piling construction or repair, particularly piling of the cast-in-place type, and such application presently appears to be particularly advantageous.

Still another feature contemplated by the invention is the obtaining of information as to bearing strengths and other engineering information which cannot practically be obtained when conventional grouting or concreting methods are used.

The purpose of the invention is to realize the above and other features by means which may be readily adapted to field operations. In many instances, the practices taught by the present invention may, if desired, be supplemented by conventional grouting or concreting operations.

Figure 23:
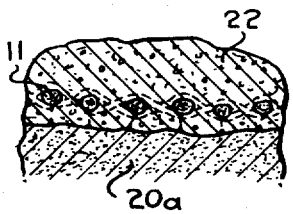
Figure 24:
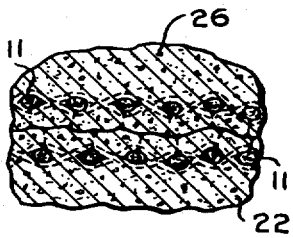

Examples of the practice of the invention are illustrated in the accompanying drawings. The views are all schematic soil cross-sections and the several examples correspond to the following grouping of figures: 1–3, 4–8, 9–11, 12–14, 15, 16–17, 18–19, 20–22, *23 and 24. FIGURES 23 and 24 are enlarged cross-sections taken on lines 23—23 and 24—24, respectively, in FIGURE 11.*

Figure 1:
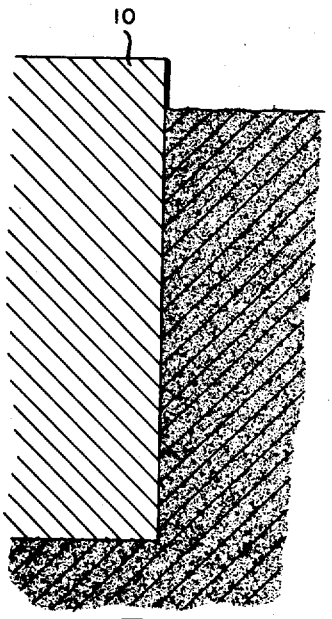
Figure 2:
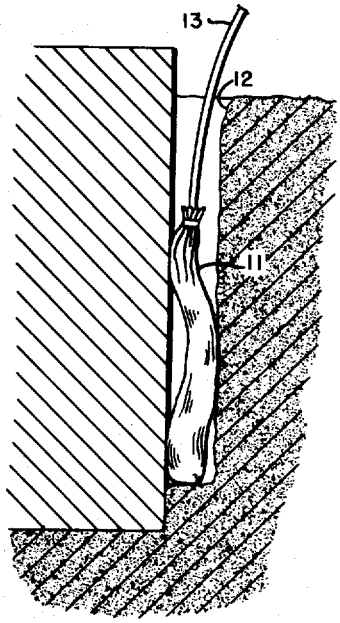
Figure 3:
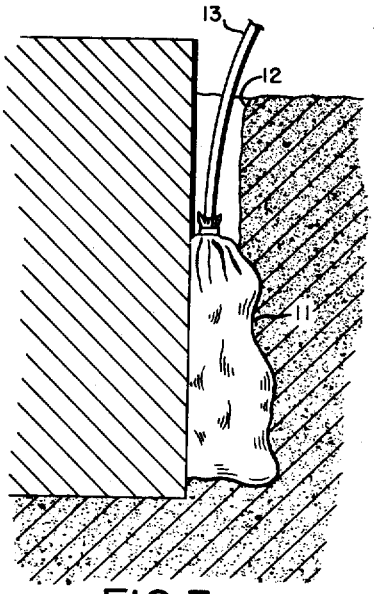

In FIGURE 1 there is shown a foundation 10, the exterior of which it is desired to grout or concrete and adjacent to which it is desired to effect a consolidation and strengthening of the surrounding supporting soil. As contemplated by the invention and shown in FIGURE 2, a porous, flexible bag 11 of fabric or other flexible material is placed at the situs where the soil consolidation is to be effected. This may be accomplished for example by drilling or digging a cavity or hole 12 into which the bag 11 is lowered. A hydraulic line 13 which may be either a flexible conduit or a rigid pipe is coupled to the porous, flexible bag 11. The porous, flexible bag may or may not be wholly or partially suspended from the line 13. When the porous, flexible bag is in position, grout is injected into the porous, flexible bag 11 through the line 13 and such injection is continued against the resistance of the surrounding soil to expansion of the porous, flexible bag 11. The porous, flexible bag expands and conforms itself and its contained mass of grout according to the strengths, weaknesses and voids of the surrounding soil areas which it confronts. Normally it will flatten itself against the foundation 10 and will assume conformations at other positions which will be to some degree irregular in most soils and which may vary in greater or lesser degree according to the pressure at which the flowable grout is injected. At most, only a small fraction of the flowable grout oozes through the porous walls of the porous, flexible bag 11 during injection. Therefore the injected grout does not migrate from the desired situs even if there are crevices or other paths or voids in the soil through which pressurized grout would without the porous, flexible bag 11 ordinarily flow. The small fraction of the flowable grout which oozes through the porous walls of the porous, flexible bag 11 is solidified in pressure contact with the soil of the cavity or situs 12 (*see FIGURE 23*), or where a solid foundation 10 or other solid is contiguous *to* the cavity 12, in pressure contact with said solid, [and] this enhances the load bearing and/or skin friction of the solidified grout to higher values and thus accomplishes the desired object of this invention referred to hereinabove. If the area of contact between the foundation 10 and the porous, flexible bag 11 is sufficiently high, or if a plurality of porous flexible bags are employed distributed over the face of the foundation 10, and if injection pressure is sufficiently high, the foundation 10 may be shifted or translated to a desired degree by the hydraulic pressure exerted by the grout, compaction and consolidation of the adjacent soil being simultaneously achieved as above described. Similarly, if the situs of grouting or concreting is under the foundation and if one or more porous, flexible bags similar to the bag 11 is placed below the underside of the foundation, either by placing the porous, flexible bags from the sides of the foundation (*see FIGURES 11, 23 and 24*) or by forming holes through the foundation and placing the bags through such holes, the foundation 10 may be raised, tilted or leveled.

Figure 11:
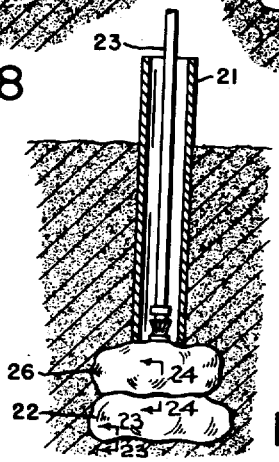

*It is inherent from the foregoing and FIGURE 11, for example, that solidified grouting between the bag means and the pressure contacted surface areas will by extension through the porous walls create a bonding effect between the solidified grout mass within the bag means and the pressure contacted areas (see FIGURES 23 and 24).*

Figure 4:
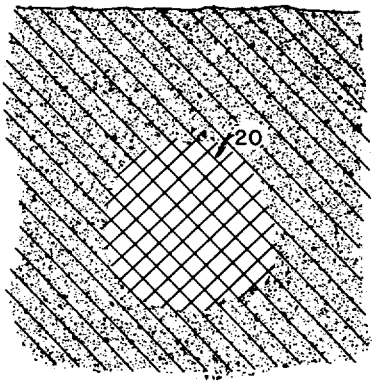
Figure 5:
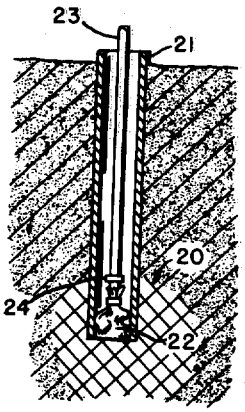
Figure 6:
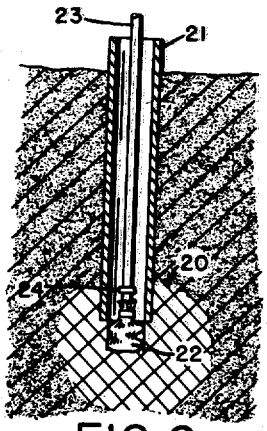
Figure 7:
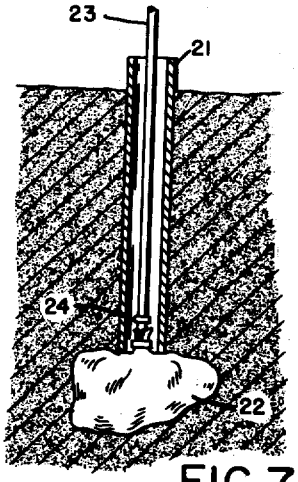
Figure 8:
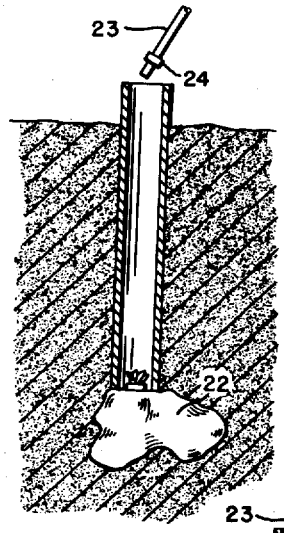

In FIGURE 4 there is indicated a soil situs 20 where it is desired to accomplish grouting or concreting. A casing 21 is driven down to the situs 20 and is cleaned out and a flexible bag 22 to which is attached a pipe 23 is inserted to the bottom of the casings as shown in FIGURE 5. The casing is then withdrawn from the bag as shown in FIGURE 6. Grout is then injected into the bag through the pipe 23 to expand the bag and compact the surrounding soil as shown in FIGURE 7. If desired, the pipe 23 may include a threaded connection or other coupling which is capable of remote disconnection as for example by twisting from the top end of the pipe 23. It may also include a check valve 24 of known type which allows flow only in the direction of injection. The pipe 23 may be disconnected and withdrawn after the injection operation is completed and the grout is set, as indicated in FIGURE 8. The casing 21 may also be withdrawn at this stage if desired.

Figure 9:
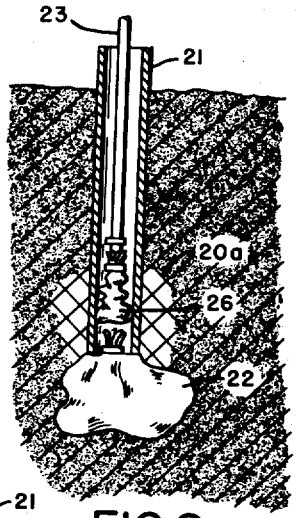
Figure 10:
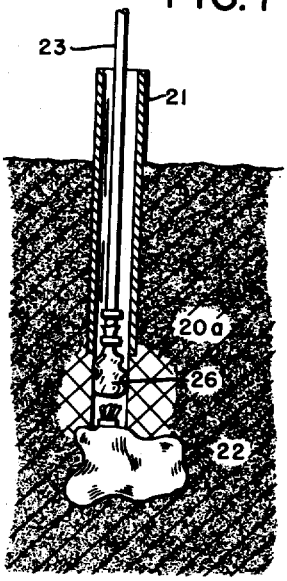

If the situs to be grouted is more extensive as indicated by 20A in FIGURE 9, the casing 21 may be left in place at least temporarily and the operations of FIGURES 5–8 may be supplemented by the operations illustrated in FIGURES 9–11. In FIGURE 9, a second porous, flexible bag 26 is inserted to a portion of the situs 20A which is contiguous to the portion just grouted. Thus FIGURE 9 will be understood to constitute a repetition of the step of FIGURE 5. FIGURES 10 and 11 are similarly repetitious of the steps of FIGURES 6 and 7, respectively. In FIGURE 10, the casing is withdrawn from the porous, flexible bag 22, and in FIGURE 11 the porous, flexible bag 26 is expanded. The completion of each repeated series of steps may include the uncoupling and removal of the pipe 23 from the most recently emplaced and expanded porous, flexible bag.

Figure 12:
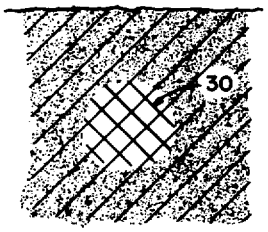

In FIGURE 12 there is indicated a soil situs 20 which is located in a relatively soft soil which may be penetrated by a bag-entraining or bag-carrying member without the necessity of previously forming an access passage to the situs. A porous, flexible bag 31 is strapped on a pipe 32 which has a protruding lower end 33 which may be pointed. By means of the pipe 32, the porous, flexible bag 31 is driven to the situs 30. The porous, flexible bag is then filled with injected grout as indicated in FIGURE 14.

Figure 13:
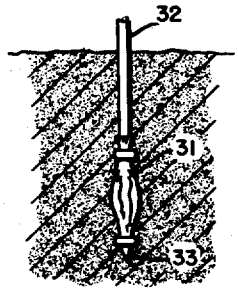
Figure 14:
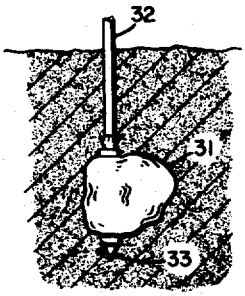

Because in the practice of the invention the grout is confined by the bag *means including one or more* bags, the volume of soil displaced by the grouting can be determined by measuring the volume of grout which is injected and subtracting the volume of any initial excavation or cavity, if any (no subtraction would be necessary in the example of FIGURES 12–14). This furnishes useful information as to the degree of soil compaction affected by the injecting operation. Knowledge of the volume of soil displacement may yield additional useful engineering information when considered together with other readily determinable or observable data, such as the pressure of injection of the grout.

Figure 15:
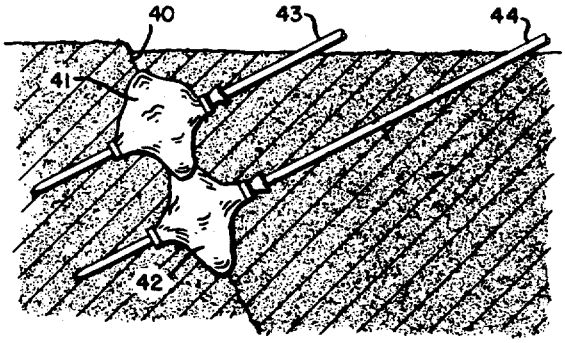

The invention may be employed to halt earth slippage and slides along shear plane by solidifying the weakened zone and leaving the pipe in place to act as a shear bar. For example a shear plane 40 shown in FIGURE 15 may be reinforced by means of expanded grout-filled bags 41 and 42 which prior to expansion have been driven into place by their associated conduit pipes 43 and 44. Each of the conduit pipes is provided with a relatively long protruding leaching end in the illustrated example, and the conduits serve as shear bars when in place.

Figure 16:
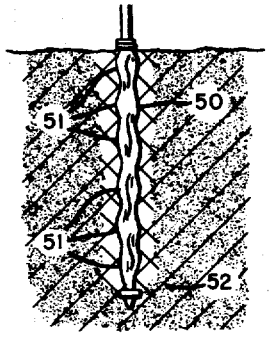
Figure 17:
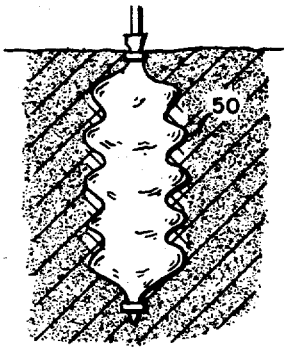

The porous, flexible bag or bags employed may be shaped in special ways to accomplish special objects. A porous, flexible bag 50 may be provided having blisters or proturberances 51 which tend to define corresponding blisters or protuberances in the injected grouting so that when the porous, flexible bag is driven into the desired situs 52 as shown in FIGURE 16 and then expanded as shown in FIGURE 17 a number of bulges are formed. In this instance at least a portion of the grout overcomes the resistance of the surrounding soil, or at least partially does so, and to such extent the soil is compacted and the grout conforms itself according to the strengths, weaknesses and voids of the surrounding soil. At least the radially outwardly extreme portions of the expanding porous, flexible bag conform themselves according to the strengths, weaknesses and voids of the surrounding soil areas.

Figure 18:
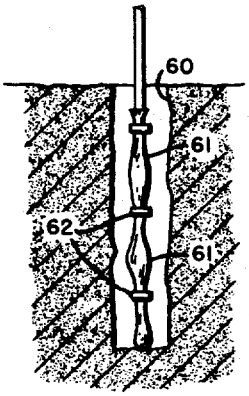
Figure 19:
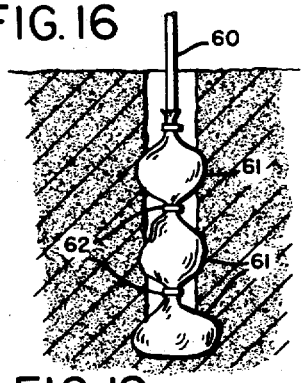

In FIGURE 18, an augered hole 60 receives a bag 61 provided with restraining collars 62 spaced along the length of the bag and held thereto by sticking or other means. Upon expansion as shown in FIGURE 19, bulges are formed which correspond to the bulges shown in FIGURE 17.

Figure 20:
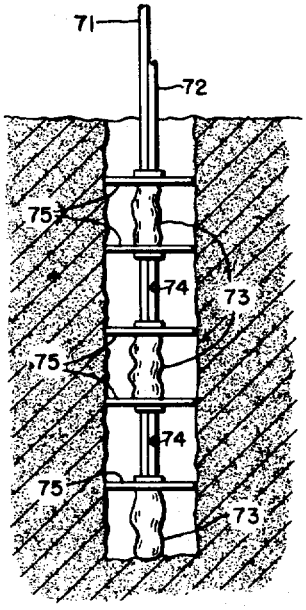
Figure 21:
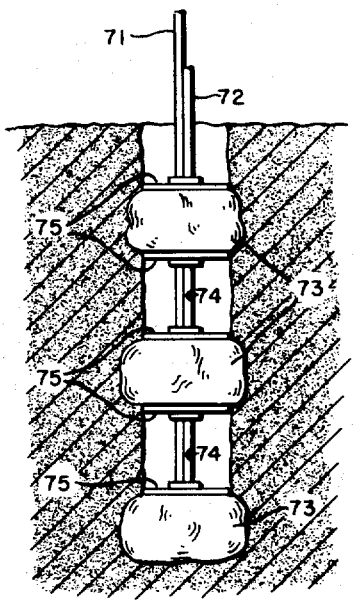
Figure 22:
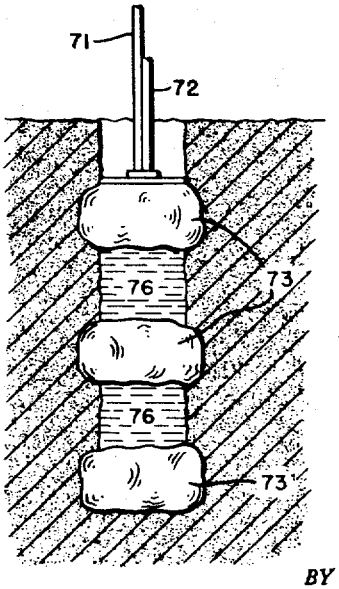

A cast-in-place piling having high skin friction and high point bearing values for a given soil or subsurface material may be formed as illustrated in FIGURES 20–22. A double pipe 71, 72 is provided having strapped therearound a series of flexible bags 73. The pipe 71 communicates with the interior of the bags 73, and the pipe 72 is provided with exterior openings 74. A hole is augered as shown in FIGURE 19. The bags 73 are emplaced as shown in FIGURE 20. The bags are then expanded by injection of grout through the pipe 71 as indicated in FIGURE 21, thereby accomplishing a vertically zoned compression of the surrounding soil. Finally grout 76 is injected into the intervening spaces from the openings 74 of the pipe 72 as indicated in FIGURE 22. If desired, stiff bag-reinforcing plates or bulkheads 75 may be mounted on the assembly to provide reinforcement for the bags during the operation illustrated in FIGURE 21. Each bag and each intervening space may be injected through its own individual pipe, if desired, the several pipes being preferably bundled together at the center of the assembly.

All the grouting operations described herein may be supplemented by conventional grouting if desired and appropriate in particular applications.

The above description of the invention should make it apparent that many details of the apparatus embodying the invention may be varied without departing from the teaching of the invention. Accordingly, the scope of the invention is not to be limited to precise details of the specifically described embodiments but is to be defined by the following claims.

What is claimed is:

1. A method of grouting a situs within a soil structure comprising placing a porous, expandible, flexible bag in unexpanded condition [at] *in* the situs and then injecting a flowable grout under pressure into said bag to expand the bag against soil surrounding the situs and continuing the injection of the flowable grout under pressure until a small fraction only of the flowable grout oozes out through the pores of the bag and the expanded bag conforms itself in shape to the surrounding soil areas contacting the expanded bag according to the strengths, weakness and voids of the surrounding soil structure without the substantial flow of grout from the desired situs into crevices in the soil, and permitting the flowable grout which has oozed through the porous bag and the flowable grout within the bag to solidify in pressure contact with areas of the situs, whereby the solidified grouting possesses a higher skin friction to said surrounding structure by reason of the direct pressure contact of the solidified grout with the surrounding structure.

2. A method of grouting a situs within a soil structure comprising placing a porous, expandible, flexible bag in unexpanded condition and attached to the lower open end of a pipe within said situs, injecting flowable grout under pressure through said pipe into said bag and continuing said injection of flowable grount under pressure through the pipe and into said bag until a small fraction of the flowable grout oozes out through the pores of the bag and the expanded bag conforms itself in shape to the surrounding areas contacting the expanded bag without the flow of grout from the situs into any voids in the soil, permitting the flowable grout which has oozed through the porous bag and the flowable grout within the bag to solidify in pressure contact with areas of the situs, and disconnecting at least a majority of the length of the pipe and removing said pipe, whereby the solidified grouting possesses a higher skin friction to said surrounding structure by reason of the direct pressure contact of the solidified grout with the surrounding structure.

3. A method of grouting a situs within a soil structure comprising placing a porous, expandible, flexible bag in unexpanded condition and attached to the lower open end of a pipe within said situs, injecting flowable grout under pressure through said pipe into said bag and continuing said injection of flowable grout under pressure through the pipe and into said bag until a small fraction of the flowable grout oozes out through the pores of the bag and the expanded bag conforms itself in shape to the surrounding areas contacting the expanded bag without the flow of grout from the situs into any voids in the soil, permitting the flowable grout which has oozed through the porous bag and the flowable grout within the bag to solidify in pressure contact with areas of the situs, and disconnecting at least a majority of the length of pipe and removing said pipe, thereafter placing a second porous, expandible, flexible bag in unexpanded condition and attached to the open end of a pipe within the situs in a contiguous position to the first bag, injecting flowable grout under pressure through said pipe into said second bag and continuing said injection of flowable grout under pressure through the pipe and into said second bag until a small fraction of the flowable grout oozes out through the pores of the second bag and the expanded second bag conforms itself in shape to the first bag and the areas of the situs contiguous thereto, permitting the flowable grout which has oozed through the second bag and the flowable grout within the second bag to solidify in pressure contact with the first bag and with the surrounding soil, whereby the solidified grouting of the two said bags are in firm contact one with the other by reason of the direct pressure contact of the solidified grout of the two said bags.

4. A method of grouting a situs within a soil structure comprising first, driving a casing downwardly to the situs and cleaning out the casing; second, inserting a porous, expandible, flexible bag in unexpanded condition and attached to the lower open end of a pipe down to the bottom of the casing; third, raising the bottom of the casing above the bag; fourth, injecting flowable grout under pressure into said bag and continuing said injection of the flowable grout under pressure against the resistance of the soil surrounding the bag until a small fraction of the flowable grout oozes through the pores of the bag and the expanding bag conforms itself in shape to the surrounding soil structure; fifth, permitting the flowable grout which has oozed through the porous bag and the flowable grout within the bag to solidify in pressure contact with areas of the situs; and sixth, repeating the second to the fifth steps at least once to build contiguous to the first formed solidified grout filled bag a series of contacting solidified grout filled bags one bag resting firmly against another bag; whereby the flowable grout oozing from a bag resting against another bag and solidified in contact with the other bag unites the solidified grout bags into a stable reenforcement.

*5. A method of providing a bracing structure at a situs including opposing surface areas, comprising: placing expandible flexible, and generally porous-walled bag means in unexpanded condition at the situs and then injecting a flowable grout under pressure into said bag means to expand the porous walls thereof against opposing surface areas of the situs and continuing the injection of the flowable grout under pressure until a small fraction only of the flowable grout oozes out through the pores of the bag means and the expanded bag means conforms itself in shape to the opposing surface areas contacting the expanded bag means according to the strengths, weakness and voids of the surface areas without substantial flow of grout into crevices in the surface areas; and permitting the flowable grout which has oozed through the porous walls and the flowable grout within the bag means to solidify in pressure contact with said opposing surface areas of the situs, whereby the solidified grouting between the bag means and the pressure contacted surface areas, by extension through the porous walls creates a bonding effect between the solidified grout mass within the bag means and the pressure contacted surface areas.*

*6. A method as set forth in claim 5, wherein said bag means includes a plurality of expandible flexible porous-walled bags, and wherein the bags are respectively expanded to form a series of contacting grout filled bags the grout which has oozed from adjacent porous walls of the contacting bags being allowed to amalgamate and solidify; the resultant extension of the grout through the adjacent porous walls thereby creating a bond between solidified grout masses within the contacting bags.*

References Cited in the file of this patent or the original patent

UNITED STATES PATENTS

| | | |
|---|---|---|
| 961,492 | Goldsborough | June 14, 1910 |
| 1,421,857 | Store | July 4, 1922 |
| 2,682,750 | Lorenz | July 6, 1954 |

FOREIGN PATENTS

| | | |
|---|---|---|
| 363,646 | Italy | Oct. 10, 1938 |